United States Patent
Rowland

(10) Patent No.: US 6,460,009 B1
(45) Date of Patent: Oct. 1, 2002

(54) TIME DELAY MEASUREMENT FOR RESPONSE SYSTEM

(76) Inventor: John C Rowland, 23 Macintosh Ln, Wappingers Falls, NY (US) 12590

( * ) Notice: Subject to any disclaimer, the term of this patent is extended or adjusted under 35 U.S.C. 154(b) by 0 days.

(21) Appl. No.: 09/514,240

(22) Filed: Feb. 28, 2000

(51) Int. Cl.[7] .......................... G04F 13/02; G04F 15/00
(52) U.S. Cl. ................. 702/176; 702/177; 702/178; 700/14; 700/15
(58) Field of Search ................. 702/176, 177, 702/178, 79, 89, 90, 91; 700/14, 15, 16, 80–81

(56) References Cited

U.S. PATENT DOCUMENTS

| | | |
|---|---|---|
| 4,403,777 A * | 9/1983 | Del Principe et al. .......... 463/1 |
| 4,478,783 A | 10/1984 | Broadwater |
| 4,517,154 A * | 5/1985 | Dennis et al. .............. 702/118 |
| 4,640,812 A | 2/1987 | Sawyer |
| 4,752,869 A | 6/1988 | Miller |
| 4,908,775 A | 3/1990 | Palusamy |
| 5,299,447 A | 4/1994 | Caron |
| 5,307,667 A | 5/1994 | Caron |
| 5,337,611 A * | 8/1994 | Fleming et al. ................ 73/622 |
| 6,014,307 A * | 1/2000 | Crimmins .................... 361/170 |
| 6,272,443 B1 * | 8/2001 | Motzko ....................... 702/142 |

* cited by examiner

*Primary Examiner*—Bryan Bui
(74) *Attorney, Agent, or Firm*—Timothy J Slabouz; Michael A Mann; Nexsen Pruet Jacobs & Pollard LLC

(57) ABSTRACT

A system that is adapted for determining the delay time between an initiating event and a response to that event. The system includes an optical sensor which is preferably a photo resistor having a resistance inversely proportional to the intensity of a warning light in its proximity. The output of the photo resistor is an analog signal that can be fed to an analog input device such as a strip chart recorder for display versus time. The initiating event signal can also be displayed so that, by comparing the signals, the delay between the initiating event and the changing of the warning light from off to on can be measured and compared to a specified value.

20 Claims, 1 Drawing Sheet

US 6,460,009 B1

TIME DELAY MEASUREMENT FOR RESPONSE SYSTEM

FIELD OF THE INVENTION

The present invention relates generally to measurement of time delays between an events and a response to the event. In particular, the present invention relates to the detection of the response of a system to an initiating event.

BACKGROUND OF THE INVENTION

Throughout industry, processes depend on a sequence of events where one action is taken in response to an initiating event: a tank fills, a valve closes once the tank fills, an agitator begins to agitate when the tank valve is closed. Sometimes the action is in response to an unexpected event that has safety consequences. For example, at a nuclear power plant, if a control rod drops into the nuclear core by accident, it may adversely affect the power distribution in other areas of the core. The response might include notification of the operator and a check on the power to the control rod actuator, for example.

Especially under circumstances where a response needs to occur within a short time after an initiating event for safety reasons, it is important to know that a response will in fact occur and will occur within a prescribed time. Because it is important, these systems may be audited to see if they respond as they are designed to do. Their response time is measured against a simulated initiating event and compared to the specified response time.

At nuclear power plants, some responses must take place very quickly after initiating events in order to prevent damage to equipment or perhaps the release of radioactive material. Measuring short time intervals to verify that response times are within specifications is a significant problem.

See for example, the patents issued to Palusamy et al., U.S. Pat. No. 4,908,775; Miller et al., U.S. Pat. No. 4,752,869; Sawyer et al., U.S. Pat. No. 4,640,812; and Dennis et al., U.S. Pat. No. 4,517,154, for examples of patents that relate generally to measurement of responses of systems at nuclear power plants.

Nonetheless there remains a need for a simple system that will measure when a response occurs following an initiating event, particularly, when the response is the lighting of a warning light to alert an operator that an initiating event has occurred.

SUMMARY OF THE INVENTION

The invention is an apparatus for determining the interval of time between an initiating event and a visual response to that event. Typically, the present apparatus is useful when verifying that short and consistent intervals are being obtained between the initiating event and response events, such as in the response system at nuclear power plants. These systems are to be tested periodically to see if the response times are within specification. The present invention makes testing much easier and more accurate.

In a preferred embodiment, the present apparatus includes an optical sensor mounted in close proximity to a warning light and connected electrically to electrical circuitry that processes the electrical output of the sensor so that an analog signal results. The analog signal can be forwarded to an output device to display changes in the signal that result from changes in the intensity of the warning light, i.e., the light has gone on or off. If the signal that caused the warning light to go on is simultaneously sent to the same output device, then a comparison of the times when the two signals (initiating and response) are received reveals the response time.

An important feature of the present invention is that the sensor can be mounted easily near the warning signal light. No electrical connection need be made with the light and its distance from the warning light need only be such that a direct exposure is available and the interference from other sources of light be relatively less than the visual signal from the warning light.

Another important feature of the present invention is the use of an optical signal from the optical sensor. Use of an optical signal avoids the need to calibrate the signal to determine on and off intensities of different lamps and different levels of ambient light.

Still another feature of the invention is the use of an optical sensor rather than other types where the signal speed between the warning lamp and sensor might be significant with respect to the response time. With optical sensors, the signal speed is virtually instantaneous.

Other features and their advantages will be apparent to those skilled in the art of instrumentation from a careful reading of the Detailed Description of Preferred Embodiment, accompanied by the following drawings.

DETAILED DESCRIPTION OF PREFERRED EMBODIMENTS

Figure 1:
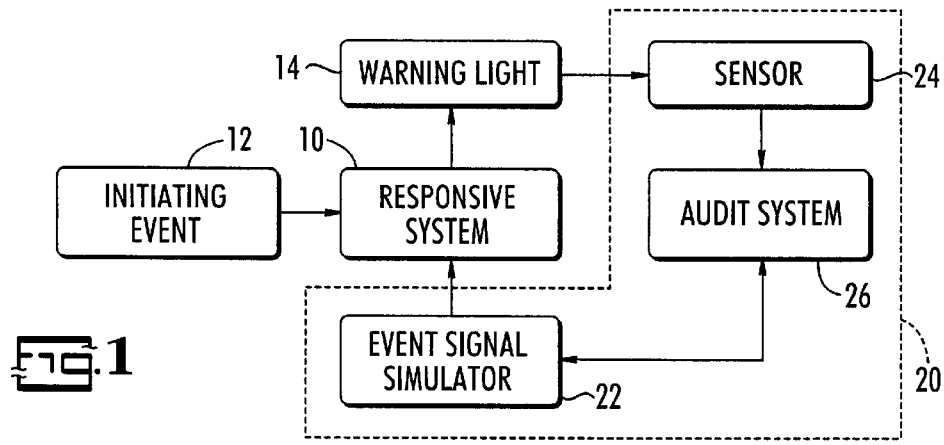
FIG. 1 is a schematic illustration of an apparatus according to a preferred embodiment of the present invention, and its relationship to the response system at a facility.

The present invention is an apparatus for measuring the response time of a response system to an initiating event. It will be illustrated in the context of a nuclear power plant but it will be clear that the invention is not limited to that context but may be readily adapted to other settings.

Essentially, the present apparatus is installed temporarily or permanently in the setting where it will be used occasionally to verify that the response time for a safety or other system is within specifications. The context therefore must include a response system 10 that responds to an initiating event 12 by causing a warning light 14 to light. The response system is not part of the present apparatus, which is generally indicated by reference number 20 directed to a collection of components tied electrically and optically with each other and to response system 10.

The present invention therefore includes an event signal simulator 22 that generates an event signal simulating the initiating event, a sensor 24 that detects a change in the intensity of warning light 14 which responds to the initiating event, and to an audit system 26 that receives a signal from sensor 24 and from simulator 22 and allows their display and analysis.

Figure 2:
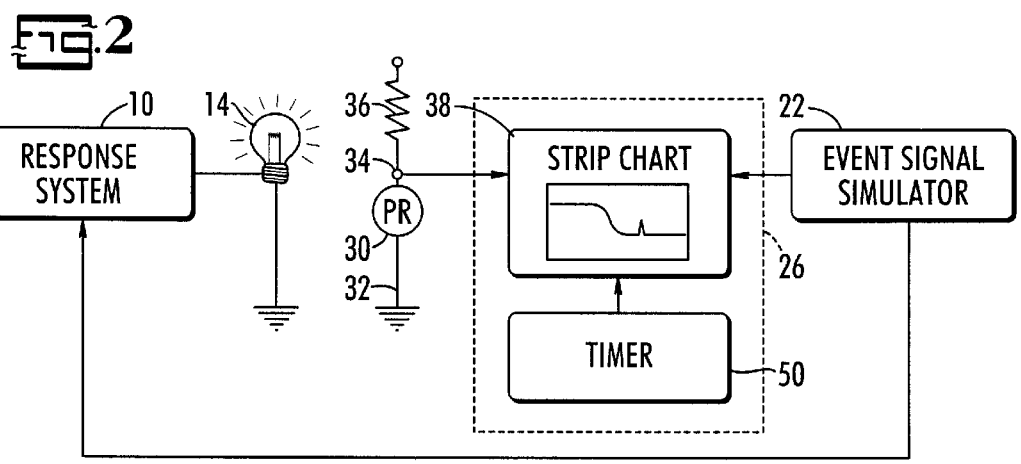
FIG. 2 is a schematic illustration of a detail of the present apparatus according to a preferred embodiment of the present invention.

FIG. 2 illustrates schematically the present invention in more detail. Warning light 14 changes in intensity in response to a signal from response system 10. The light from warning light 14 reaches optical sensor 24, which is preferably a photo resistor 30. Photo resistor 30 is preferably a cadmium sulfide photo resistor and is connected to ground on a first side 32 and on a second side 34 to a pull up resistor 36. The output from second side 34 is an analog signal that is inversely proportional to the intensity of the light from warning light 14. Pull up resistor 36 divides the voltage in accordance with the resistance of resistor 36 so that a low voltage signal is output from photo resistor 30 at second side 34. The output from second side 34 is fed into an analog input such as the input of a strip chart 38. This arrangement reduces the impact of electrical noise that otherwise affects the operation of photo resistor 30. Also, the use of an analog signal rather than a digital signal allows a programmed computer to calibrate the data to compensate it for different lamp intensities and ambient light conditions.

Figure 3:
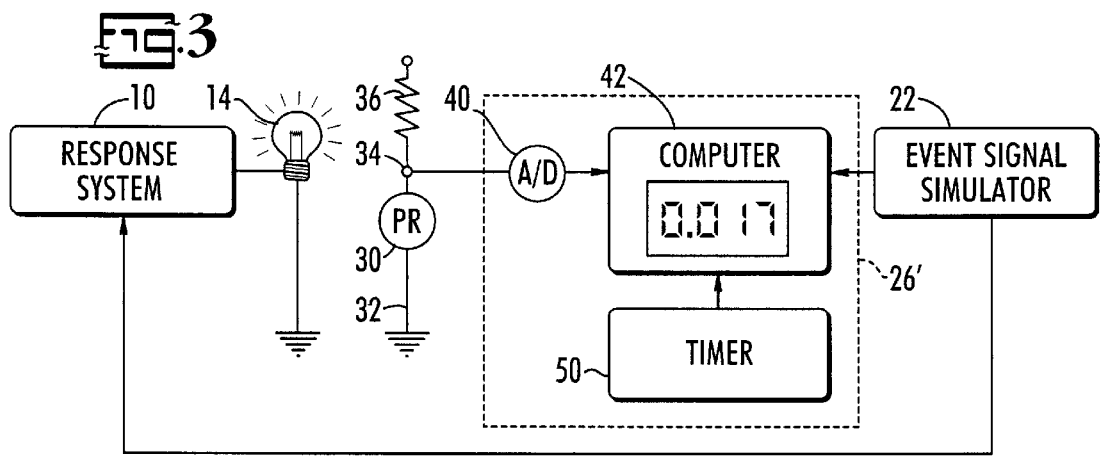
FIG. 3 is a schematic illustration of a detail of the present apparatus according to an alternative preferred embodiment of the present invention.

Alternatively, as illustrated schematically in FIG. 3, the output from second side 34 can be converted to a digital signal by an analog-to-digital converter 40 and displayed by a computer 42, for example.

The junction voltage is recorded by strip chart 38 as an indication of the status of warning light 14. Any change in lamp intensity is recorded and can be later interpreted.

This apparatus is noninvasive, easy to install and remove, and allows for highly accurate high speed detection of the status of warning light 14. It is useful for response time testing, and the status of warning light 14, which indicates whether warning light 14 is on or off, would be recorded so that the initiating event, or "trip", and its corresponding reset points can be easily determined by seeing what the voltage on strip chart recorder 38 was when warning light 14 changed state from "off" to "on". This application would allow trip checks to be done in a matter of seconds rather than the current 10–15 minutes, which vastly reduces the time a system is undergoing testing.

The raw data carried by the signals from optical sensor 24 may be forwarded to either strip chart recorder 38 or computer 42 where they are time tagged, loaded into a database and analyzed to determine a change in the signal and the corresponding time of the change. Sophisticated spreadsheet software aided by macro files can be used to record the data and determine when the "on" and the "off" occurs. A precision timing card in the computer generates a timing signal that is recorded in a database along with data from each sensor. The data in the database can be analyzed and plotted to show the response time for each signal, and perhaps compare each response time to a prescribed maximum response time to verify compliance with standards or specifications.

The apparatus can be activated manually by component 22 using a hand switch or automatically in response to a digital signal from, say, a relay opening or closing. That signal is simultaneously fed to each recorder 38 or computer 42. Upon receipt of the initiating signal, all the recorders 38 or computers 42 begin collecting raw data from optical sensors 24 connected to each of them and associating that signal with a time. The data from each sensor is maintained by its recorder 38 or computer 42 as a separate chart or as a file that can be off-loaded via floppy disk or direct cable connection to a central computer.

A timing program in a timer 50 produces a 1/1000 of a second time tick by counting backwards from an arbitrary but high maximum count, preferably 10,000 minutes. Timer 50 itself is composed of cascaded registers: one for dividing a time card's 10 MHz clock signal to 1/1000 of a second, another register keeps track of 60,000 one thousandths or one minutes worth of "ticks". The third register keeps track of the minutes.

When the initiating signal is received by strip chart 38 or computer 42, it begins to record the incoming analog or digital input from optical sensor 24 to a datafile along with a time from timer 50 and then waits until either (1) the timer shows 1/1000th of a second has elapsed or (2) a stop signal has been received. If the timer shows 1/1000th of a second has elapsed, the data are recorded, and again they are time tagged. If a stop signal has been received, the process stops. The macros review the accumulated data to determine when a change in data values is indicative of a response event and compares the time associated with that data entry with the time of the initiating event to determine the response time.

Timer 50 plus strip chart recorder 38 are part of the audit system 26 of FIG. 1, or, alternatively, timer 50 plus analog-to-digital converter 40 and computer 42, for an alternative audit system 26'.

If there are dozens of optical sensors 24 monitoring dozens of warning lights 14, some of which are keyed to the responses of other devices, the recorders 38 or computers 42 can sort out all the response times and display them for convenient comparison with standards or specifications and determine if any do not meet standards or are out of specification. If the sensors are coupled to 10 different recorders or computers and they monitor responses to a single initiating signal—such as the tripping of a relay or the throwing of a manual switch—the computers and recorders can all receive the initiating signal by telephone wire and thus share a common starting point for recording elapsed time.

The apparatus includes one or more strip chart recorders 38 or computers 42, optical sensors 24 and wiring to connect the sensors to the recorders or computers. If more than one recorder 38 or computer 42 is used, the additional ones may be in different locations and connected via telephone wire (such as a RJ114 conductor wire or dedicated telephone line). An optical sensor 24 or more than one optical sensor may be mounted to a light, and send a signal to its local computer for collection and analysis.

In protective systems at, for example, nuclear power plants, indicating lights are used to indicate the state of the protective system bi-stables. The present system can record the time at which the input signal is given for a particular channel and the response time of all bi-stables connected to that protective system channel. A ramp input signal can be injected, in either the up or down direction, and recorded along with the time the bi-stable indicating light changes. Using the digital recording system of the present invention, the trip point and reset point for each bi-stable can be precisely determined by comparing the input signal to the point in time where the bistable light is illuminated or is extinguished. This approach can save a great deal of time in testing and vastly reduce the time that a protective channel is unavailable for service because of testing.

It will be apparent to those skilled in the art of instrumentation that many changes and substitutions may be made to the foregoing preferred embodiment without departing from the spirit and scope of the present invention, defined by the appended claims.

What is claimed is:

1. An apparatus for measuring the delay time between an initiating event and a change in intensity of a light, said apparatus comprising:

an optical sensor in visual communication with a light and adapted for generating an electrical output signal having a magnitude related to the amount of light energy received by said optical sensor, said light being used to indicate the operational status of a response system having at least two operational states;

means for recording data from input signals over time, said recording means adapted to begin recording upon receiving a start signal and to stop recording upon receiving a stop signal, said input signals comprising said electrical output signal from said optical sensor, said start signal and said stop signal; and means for providing said start signal and said stop signal to said recording means, said start signal causing said recording means to begin recording said data being input into said recording means from said input signals and causing a start time to be associated with the beginning of the recording of said data, wherein when said response system is activated to produce a response said start signal is simultaneously provided to said recording means, wherein when the status of said response system changes in response to said activation a related change in the amount of light energy emitted by said light occurs causing a change in said magnitude of said electrical output signal from said optical sensor, wherein said recording means records said change in said magnitude of said electrical output signal from said optical sensor and associates a finish time with said change in said magnitude of said electrical output signal from said optical sensor, and wherein by calculating the difference between said finish time and said start time the amount of time that elapsed between said activation of said response system and the change between operational states of said response system in response to said activation can be determined.

2. The apparatus as recited in claim 1, wherein said optical sensor is a photo resistor.

3. The apparatus as recited in claim 1, wherein said optical sensor is a cadmium sulfide photo resistor.

4. The apparatus as recited in claim 1, wherein said optical sensor is a photo resistor joined to a pull up resistor at a junction and where said electrical output signal is taken from said junction.

5. The apparatus as recited in claim 1, wherein said recording means further comprises a strip chart recorder having a time-calibrated recording speed that is adapted for using time-calibrated recording paper for visually displaying said data from said input signals and adapted to provide said start signal and said stop signal, wherein, by analyzing the visual display of said data from said input signals on said time-calibrated recording paper with respect to said time-calibrated recording speed, the amount of time that elapsed between said activation of said response system and the change in operational status of said response system in response to said activation can be determined without requiring physical electrical interconnection with said response system.

6. The apparatus as recited in claim 1, wherein said optical sensor is a cadmium sulfide photo resistor joined to a pull up resistor at a junction, wherein said electrical output signal being received by said recording means from said optical sensor is carried by said junction.

7. The apparatus as recited in claim 1, further comprising:
an analog to digital converter adapted for converting said electrical output signals from said optical sensor into digital electrical signals; and
a device selected from a group consisting of a computer mouse and a computer keyboard, said device adapted for providing said start signal and said stop signal, and wherein said recording means further comprises a computer having a precision timing device adapted for providing said start time and said finish time and adapted for receiving said start signal and said stop signal from said device.

8. An apparatus for measuring the delay time between an initiating event and a change in intensity of a light, said apparatus comprising:

an optical sensor in visual communication with a light and adapted for generating an electrical output signal having a magnitude related to the amount of light energy received by said optical sensor, said light being used to indicate an operational state of a response system, said response system having at least two operational states and adapted to change state between said at least two operational states upon receiving a change in operational state activation signal; and means for recording data from input signals over time, said recording means adapted to begin recording upon receiving said change in operational state activation signal and to stop recording upon receiving a stop signal, said input signals including said electrical output signal from said optical sensor, said change in operational state activation signal and said stop signal; wherein said change in operational state activation signal is simultaneously transmitted to said response system and to said recording means, wherein when said recording means receives said change in operational state activation signal said recording means begins recording data being input into said recording means from said input signals and associating the beginning of the recording of said data with a start time, and wherein when said response system changes between said at least two operational states in response to said change in operational state activation signal a related change in the amount of light energy emitted by said light occurs causing a change in said magnitude of said electrical output signal from said optical sensor, and wherein said recording means records said change in said magnitude of said electrical output signal from said optical sensor and associates a finish time with said change in said magnitude of said electrical output signal from said optical sensor, and wherein by calculating the difference between said finish time and said start time the amount of time that elapsed between said change in operational state activation signal being received by said response system and the change in operational state of said response system in response to said change in operational state activation signal can be determined.

9. The apparatus as recited in claim 8, wherein said recording means further comprises a device that is selected from the group consisting of a strip chart recorder and a computer.

10. The apparatus as recited in claim 8, wherein said optical sensor is a photo resistor joined to a pull up resistor at a junction and wherein said output is taken from said junction.

11. The apparatus as recited in claim 8, wherein said activation signal is transmitted automatically.

12. The apparatus as recited in claim 8, wherein said recording means further comprises a means for automatically determining the amount of time that elapses from when said recording means receives said change in operational state activation signal until when said recording means receives said electrical output signal from said optical sensor that indicates that said response system has changed between said at least two operational states.

13. The apparatus as recited in claim 12, wherein said amount of time determining means is a computer system having a database and having executable software programs installed, said database adapted for storing the data received by said recording means, said executable software programs adapted for reading and manipulating the data stored in said database in order to determine a response time of said response system to said change in operational state activation signal causing said response system to change between said at least two operational states.

14. The apparatus as recited in claim 13, wherein said executable software programs include a tolerance program, said tolerance program adapted for comparing each said determined response time with a maximum allowed response time stored in said computer system associated with each said determined response time and to provide a user a notification of when said maximum allowed response time is exceeded by said determined response time for any said response time being compared by said tolerance program.

15. An apparatus for measuring the delay time between an initiating event and a change in the intensity of a warning light, said apparatus comprising:

a signal generator adapted for simultaneously providing electrical signals to a response system and to a signal bus, said response system having a trip state and a reset state and a warning light, said warning light providing an indication of whether said response system is in said trip state or in said reset state; said indication being a change in light intensity of said warning light;

an optical sensor in visual communication with said warning light and adapted for providing analog output signals having a magnitude that is related to said warning light intensity;

a signal monitoring system adapted for receiving said signal bus electrical signals and said output signals from said optical sensor, wherein the magnitude of said electrical signals sent to said response system causes said response system to either be in said trip state or said reset state, wherein, when said signal generator sends a state changing electrical signal to said response system and to said signal monitoring system through said signal bus, said signal monitoring system records the time received and the magnitude of said state changing signal along with the magnitude of said output signals from said optical sensor, wherein said response system reacts to said state changing signal by changing said warning light intensity when said response system changes between said response system's trip state and said reset state, and wherein the time said response system state change occurs and the magnitude of said state changing electrical signal are recorded by said signal monitoring system; and time keeping means connected to said signal monitoring system.

16. The apparatus as recited in claim 15, wherein said time keeping means keeps track of time in thousandths of a second.

17. The apparatus as recited in claim 15, wherein said signal monitoring system is adapted to determine when said warning light has changed between an "off" status and an "on" status.

18. The apparatus as recited in claim 15, further comprising:

means for providing a master initiating event signal that is adapted for receiving and transmitting said electrical signals from said signal generator;

a plurality of response systems, each of said plurality of response systems having one said warning light;

a plurality of optical sensors, each of said plurality of optical sensors adapted for monitoring one of said one said warning light so that each said warning light is monitored by at least one optical sensor;

a plurality of signal monitoring systems adapted for making response time determinations, each of said plurality of signal monitoring systems adapted for receiving input signals from one of said plurality of optical sensors and from said means for providing a master initiating event signal, wherein said means for providing a master initiating event signal is capable of providing a single initiating event signal to each of said plurality of signal -monitoring systems in order to synchronize each of said plurality of signal monitoring systems with a starting time for each said response time determination being made with the ending time being provided by said one of said plurality of optical sensors that is associated with one of said plurality of signal monitoring systems.

19. The apparatus as recited in claim 15, wherein said signal generator is adapted to provide a variable magnitude electrical signal, and wherein said signal monitoring system is capable of simultaneously recording the time received and the magnitude of said output signals from said optical sensor and the time received and the magnitude of said variable magnitude electrical signal causing said response system to change between said trip state and said reset state as indicated by said change in magnitude in said output signals from said optical sensor.

20. The apparatus as recited in claim 19, further comprising means for analyzing and comparing the changes in magnitude of said output signals from said optical sensor and adapted for filtering out light noise caused by ambient light received by said optical sensor in order to determine a base light intensity for said warning light being monitored by said optical sensor for both said trip state and said reset state.

* * * * *